United States Patent [19]

Currier et al.

[11] Patent Number: 4,974,292
[45] Date of Patent: Dec. 4, 1990

[54] APPARATUS FOR HANDLING PACKAGING OF EMULSIFIED MEAT PRODUCTS

[75] Inventors: Joseph G. Currier, Lee's Summit, Mo.; Warren R. Schack, Leawood, Kans.

[73] Assignee: Marlen Research Corporation, Overland Park, Kans.

[21] Appl. No.: 402,827

[22] Filed: Sep. 5, 1989

[51] Int. Cl.$^5$ .............................................. A22C 11/02
[52] U.S. Cl. .......................................... 17/38; 17/35; 366/316
[58] Field of Search ........................ 17/35, 41, 36–38, 17/49; 366/306, 315, 316, 328, 336

[56] References Cited

U.S. PATENT DOCUMENTS

| | | | |
|---|---|---|---|
| 2,092,992 | 9/1937 | Thalman | 366/328 |
| 3,377,139 | 4/1968 | MacGregor et al. | 366/316 |
| 3,799,457 | 3/1974 | Ward et al. | 366/316 |
| 4,051,574 | 10/1977 | Gaspar | 17/35 |
| 4,097,962 | 7/1978 | Alley et al. | 17/38 |
| 4,479,614 | 10/1984 | Bernard | 241/82.2 |
| 4,700,899 | 10/1987 | Powers et al. | 241/30 |
| 4,747,342 | 5/1988 | Schack et al. | 99/472 |
| 4,874,248 | 10/1989 | Luetzelschwab | 366/316 |

OTHER PUBLICATIONS

Brochure entitled "Marlen 550 Vacuumizer's Proven Field Performance" by Marlen Research Corporation of Overland Park, Kan.

*Primary Examiner*—Willis Little
*Attorney, Agent, or Firm*—Hovey, Williams, Timmons & Collins

[57] ABSTRACT

Improved apparatus (10) for the handling and packing of meat emulsion products is provided which eliminates the problem of "swirl" in such products, i.e., the undesirable appearance of red meat particles in a circular or spiral pattern. The apparatus (10) preferably includes a piston-type food pump (12) equipped with a vacuumizer (24), and a downstream emulsified product sizer (14). A conveying tube (16) operatively couples the pump (12) and sizer (14). The assembly (16) is in the form of an elongated tube (36) having a plurality of axially spaced apart, flow-disrupting disk sets (48) therein. Each disk set (48) has an apertured disk (50) and a downstream, smaller diameter, imperforate disk (56).

10 Claims, 1 Drawing Sheet

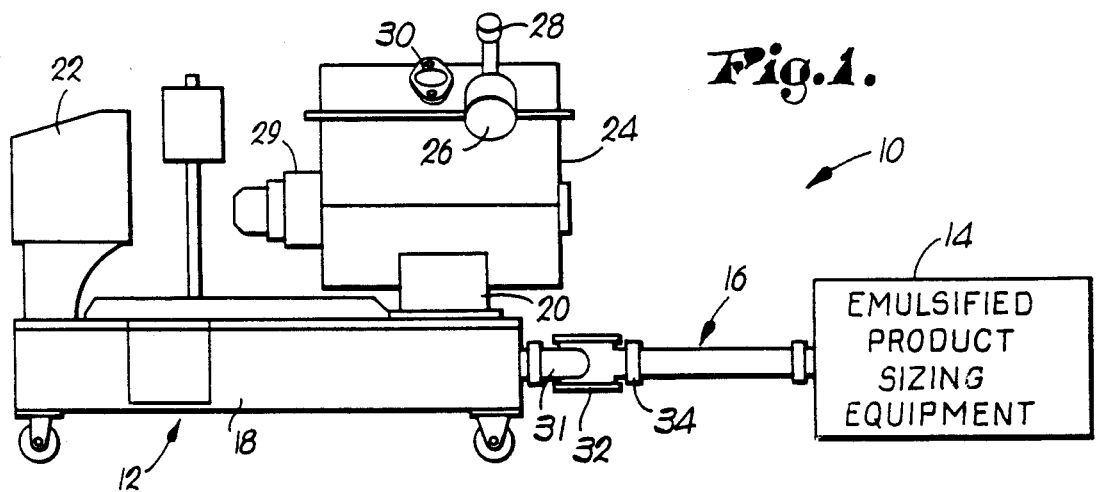
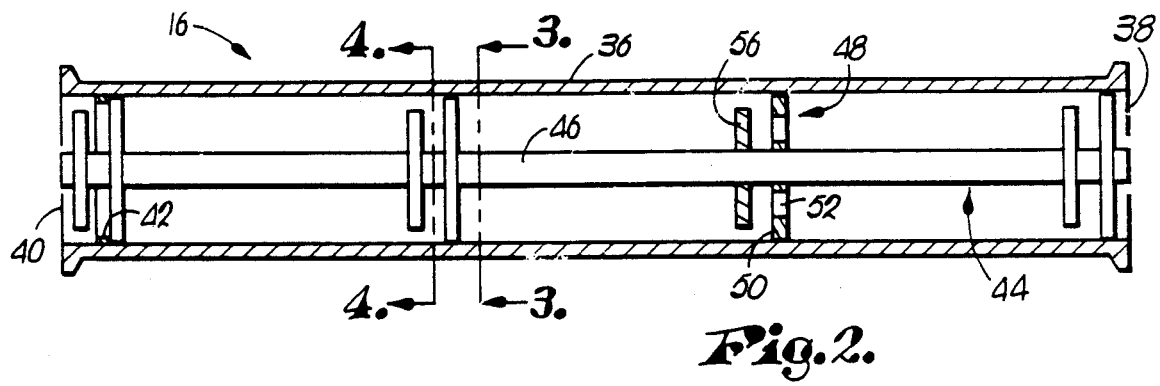
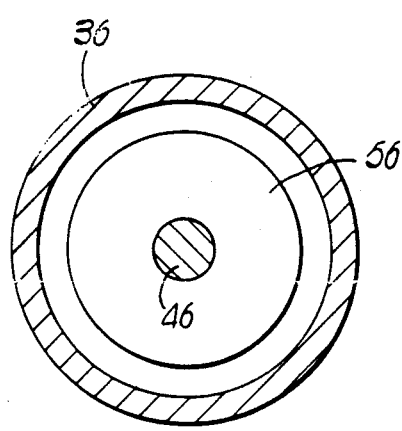
Fig.4.
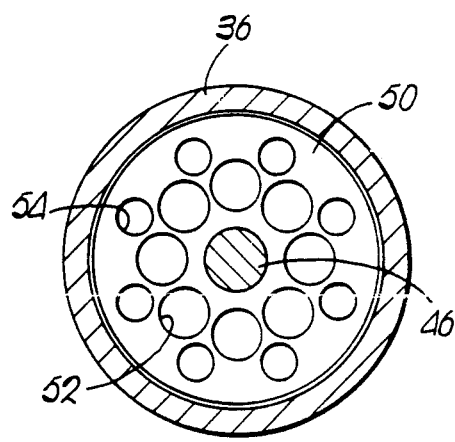
Fig.3.

APPARATUS FOR HANDLING PACKAGING OF EMULSIFIED MEAT PRODUCTS

BACKGROUND OF THE INVENTION

1. Field of the Invention

This invention is broadly concerned with improved apparatus for the handling of emulsified meat products such as bolognas, sausages and weiners. More particularly, it is concerned with handling/packaging apparatus which is improved by provision of an emulsion-conveying tube situated between the typical meat pump and sizing apparatus of a conventional processing plant, wherein the tube includes a plurality of axially spaced apart, emulsion flow-disrupting elements within the tube which inhibit the formation of "swirl" in the final meat emulsion products.

2. Description of the Prior Art

Producers of emulsified food products such as bolognas typically make use of industrial meat pumps which are directly coupled to devices for placing respective quantities of the pumped emulsion into casings; such downstream casing equipment is generally referred as "sizing" apparatus. Final encased emulsion products can then be cooked and are ready for consumption.

It sometimes occurs that final emulsion meat products exhibit an undesirable organoleptic characteristic known as "swirl." This phenomenon exhibits itself as a circular or spiral pattern of red meat particles within the overall matrix of the cooked emulsion, and is deemed to be unacceptable.

The problem of swirl can be particularly acute when use is made of piston-type food pumps which are known to be exceptionally gentle to the products being pumped, especially when equipped with deaerating or vacuumizing devices for preventing voids. Pumps of this variety are in general superior, but the swirl phenomenon can create problems for processors who would otherwise choose a pump of this character.

SUMMARY OF THE INVENTION

The present invention overcomes the problems outline above, and provides an improved apparatus for the handling and packaging of meat emulsions. Broadly speaking, the apparatus of the invention includes pumping means having structure for receiving a quantity of meat emulsion, and an outlet for delivery of an output stream of the emulsion under pressure. Sizing means for receiving the emulsion stream, and for placing respective quantities thereof into casings, also forms a part of the preferred apparatus. Finally, means for inhibiting swirl formation in the final emulsified meat products is also provided, and includes an elongated, emulsion-conveying tube operatively coupled between the pump outlet and the sizing means. The tube is equipped with a plurality of axially spaced apart, emulsion flow-disrupting elements within the tube, advantageously in the form of plural, apertured disk sets.

In preferred forms, the pumping means is a twin piston pump of the type commercialized by Marlen Research Corporation of Overland Park, Kans. Pumps of this variety are illustrated in U.S. Pat. Nos. 4,097,962, 4,479,614, 4,700,899 and 4,747,342, all of which are incorporated by reference herein. Furthermore, it is preferred that the Marlen pump be equipped with an agitated kettle-type vacuumizer known as the "Model 550", and a Marlen brochure entitled "Marlen 550 Vacuumizer's Proven Field Performance" is also incorporated by reference herein.

The sizing equipment can be of any conventional commercial type, for example the "Model RS 4201" device commercialized by Tipper Tie, Inc. of Apex, N.C.

The connecting tube of the invention preferably is circular in cross section and includes a plurality of spaced apart disk sets along the length thereof. Each pair includes an initial, apertured disk having a sliding fit diameter within the tube, with a downstream, imperforate, smaller diameter disk.

BRIEF DESCRIPTION OF THE DRAWING

FIG. 1 is an essentially schematic side elevational view of the preferred handling/packaging apparatus of the invention;

FIG. 2 is a sectional view of the emulsion-conveying tube coupling the pump and sizing equipment depicted in FIG. 1;

FIG. 3 is a vertical sectional view taken along line 3—3 of FIG. 2 and illustrating the construction of an apertured disk within the emulsion-conveying tube; and FIG. 4 is a vertical sectional view taken along line 4—4 of FIG. 2 and depicting the construction of a downstream, imperforate disk.

DESCRIPTION OF THE PREFERRED EMBODIMENT

Turning now to the drawing, and particularly FIG. 1, handling/packaging apparatus 10 for emulsified meat products is illustrated. The apparatus includes a twin piston pump 12 together with emulsified product sizing equipment 14. The pump 12 and equipment 14 are interconnected by means of emulsion-conveying tube assembly 16.

In more detail, the pump 12 as illustrated is a known twin-piston pump sold by Marlen Research Corporation of Overland Park, Kans. The pump 12 includes a lower cabinet 18 housing the juxtaposed reciprocable piston/sleeve assemblies, as well as a meat inlet 20. Moreover, the overall pump includes a control console 22 and an upright, kettle-type deaerating apparatus or vacuumizer 24. The latter includes an inlet 26, controlled by pneumatic cylinder 28, motor-operated agitator 29, and port 30 for attachment of a vacuum pump to the vacuumizer 24. Finally, the pump 12 includes a somewhat Y-shaped, bifurcated transition 31 equipped with an internal flapper valve 32 and presenting a terminal outlet 34.

As indicated previously, the pump 12 and vacuumizer 24 are entirely conventional. As those skilled in the art will readily appreciate, a meat emulsion fed to inlet 26 is first deaerated within vacuumizer 24, whereupon the deaerated emulsion is conveyed through inlet 20 for pumping. The twin piston/sleeve assemblies within pump cabinet 18 delivers successive quantities of emulsified meat under pressure through transition 31 for delivery as an output stream from outlet 34.

The sizing equipment 14 has been depicted only schematically, inasmuch as this equipment is likewise entirely conventional. A number of devices may be employed in this context, e.g., the Tipper Tie unit described previously. Suffice it to say that the sizing equipment is operable to receive quantities of emulsified meat, and to place these in appropriate meat casings for final cooking of the emulsion.

The conveying tube assembly 16 is best illustrated in FIGS. 2-4 and includes an elongated, metallic, circular in cross-section tube 36 provided with an inlet end 38 and an outlet end 40, the end sections of the tube being equipped with the usual integral connection flanges. Furthermore, an internal abutment ring 42 is secured within tube 36 adjacent outlet end 40, for purposes to be described.

The assembly 16 further includes an internal flow-disrupting device situated within tube 36. The device 44 has an elongated, central, axially extending metallic shaft 46 as well as a plurality (here four) disk sets 48. Each set 48 includes an upstream, apertured disk 50 (see FIG. 3) secured to shaft 46 and presenting an inner array of relatively large diameter apertures 52 therethrough, as well as an outer array of apertures 54 of somewhat smaller diameter. Referring to FIG. 4, it will be seen that each set 48 also includes a downstream, imperforate disk 56 likewise secured to the shaft 46. The disk 56 is of smaller diameter than the adjacent, upstream apertured disk 50, and the latter being designed for a smooth, sliding fit within tube 36.

Preferably, the entire assembly 16, including tube 36 and device 44, is formed of stainless steel for purposes of cleanliness and maintenance of sanitary conditions.

In the operation of assembly 16, flowable emulsion delivered from pump outlet 34 enters the inlet end 38 of tube 36, and passes through the latter to sizing equipment 14. During such passage through the tube 36, the emulsion is subjected to significant disruptions in flow as it traverses each disk set 48. As will be readily appreciated from a study of FIGS. 2-4, the emulsion first encounters an apertured disk 50 and passes through the apertures 52, 54 therein. After such passage, the emulsion then encounters the adjacent downstream imperforate disk 56 and must traverse a tortuous flow path around this downstream disk. The multiple disk sets forming a part of the device 44 of course ensure thorough and complete mixing of the emulsion prior to entrance thereof into sizing equipment 14. In any event, the resultant emulsified meat product from the equipment 14 is substantially free of undesirable swirl. At the same time, by virtue of use of vacuumizer 24, the products are also largely free of unwanted voids.

During flow of emulsion through the tube 36, the device 44 is prevented from exiting tube 36 because of the presence of abutment ring 42. Without such a device or its equivalent, the device 44 could shift outwardly under the influence of meat emulsion traversing the tube.

We claim:

1. Apparatus for handling and packaging of an emulsified meat product, comprising:
   pumping means including structure for receiving a quantity of meat emulsion, and outlet means for delivery of an output stream of the emulsion under pressure;
   meat emulsion sizing means for receiving a stream of meat emulsion, and for placing respective quantities of said stream into emulsion casings; and
   means for inhibiting the formation of swirl in encased mean emulsion products, including an elongated emulsion-conveying tube operatively coupled between said pump outlet means and said sizing means, a plurality of axially spaced apart, apertured, flow-disrupting disks within said tube, an imperforate disk proximal to at least certain of said apertured disks and each imperforate disk having a diameter smaller than the diameter of the associated apertured disk, and means statically mounting said apertured and imperforate disks within said tube for preventing substantial movement of the disks.

2. Apparatus as set forth in claim 1, including means for deaerating said meat emulsion prior to entrance thereof into said tube.

3. Apparatus as set forth in claim 1, said pumping means comprising a piston pump.

4. Apparatus as set forth in claim 1, including an imperforate disk adjacent to and downstream from each of said apertured disks.

5. Apparatus as set forth in claim 1, said disk mounting means comprising an elongated nonpowered nonrotative shaft.

6. Apparatus for handling of meat emulsion, comprising:
   pumping means including structure for receiving a quantity of means emulsion, and outlet means for delivery of an output stream of the emulsion under pressure; and
   means for inhibiting the formation of swirl in final meat emulsion products made from said output stream, including an elongated, emulsion-conveying tube operatively coupled with said pump outlet means, a plurality of axially spaced apart, apertured, flow-disrupting disks within said tube, an imperforate disk proximal to at least certain of said apertured disks and each imperforate disk having a diameter smaller than the diameter of the associated apertured disk, and means statically mounting said apertured and imperforate disks within said tube for preventing substantial movement of the disks,
   the end of said tube remote from said pump outlet means including structure for permitting operative connection of the tube to downstream emulsion sizing equipment.

7. Apparatus as set forth in claim 6, including means for deaerating said meat emulsion prior to entrance thereof into said tube.

8. Apparatus as set forth in claim 6, said pumping means comprising a piston pump.

9. Apparatus as set forth in claim 6, including an imperforate disk adjacent to and downstream from each of said apertured disks.

10. Apparatus as set forth in claim 6, said disk mounting means comprising an elongated, nonpowered, nonrotative shaft.

* * * * *